Patented July 10, 1945

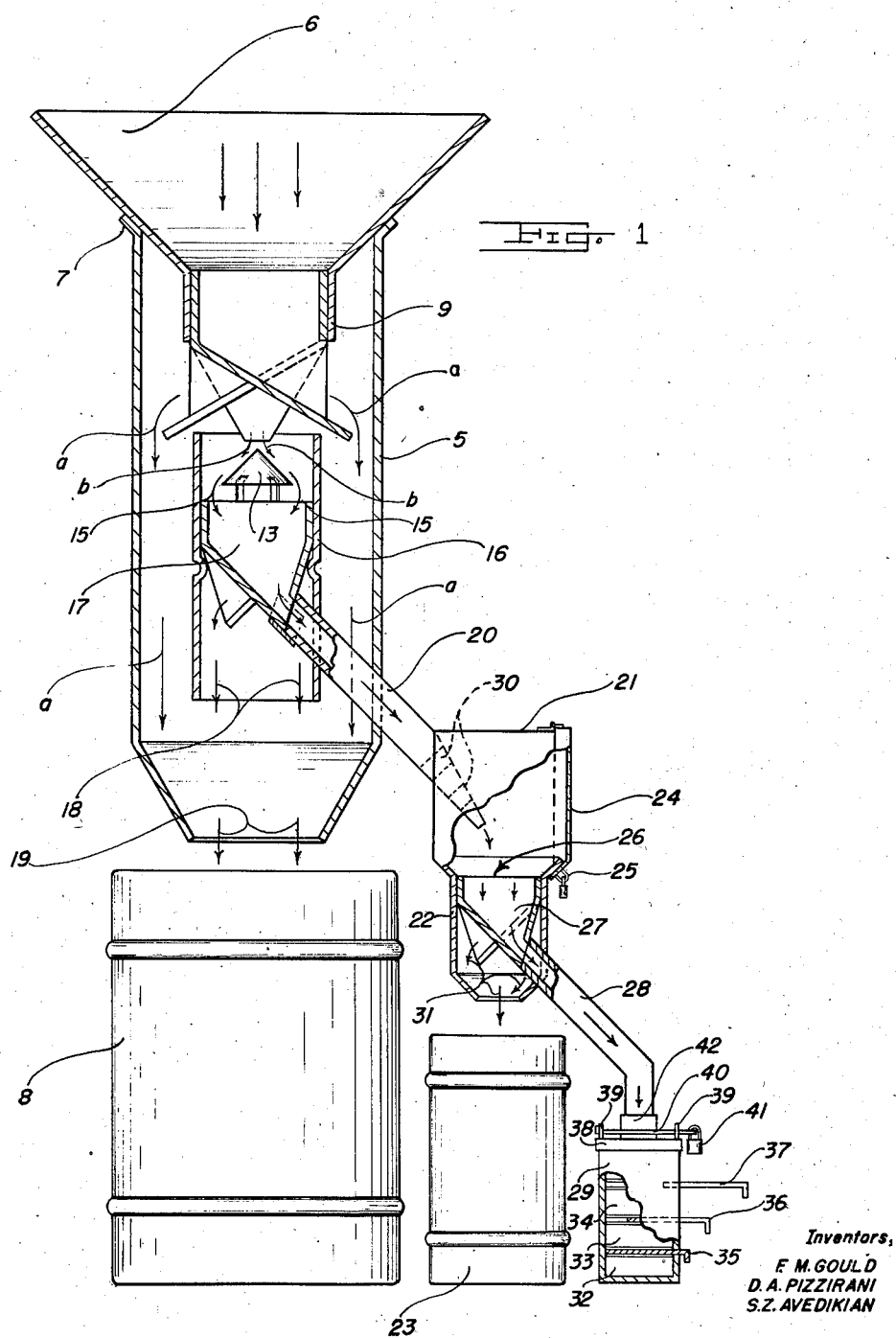

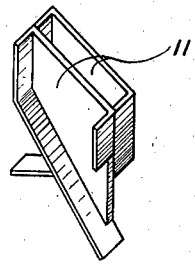
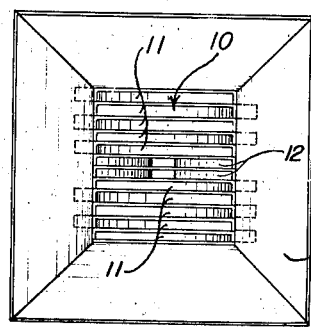
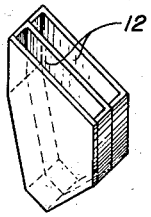
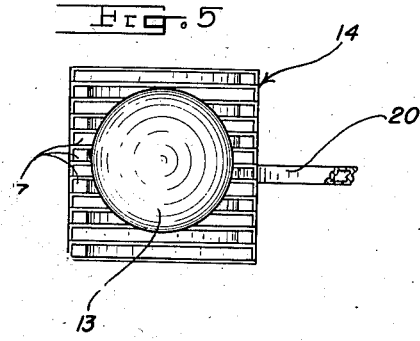
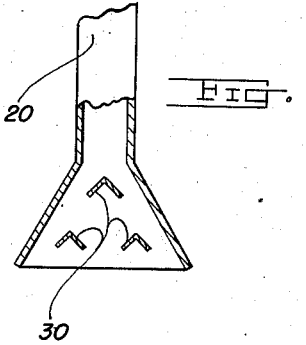
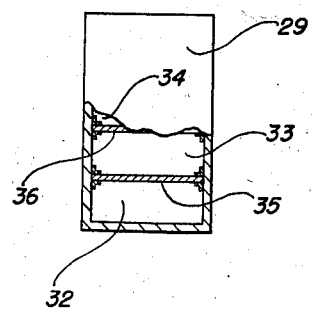
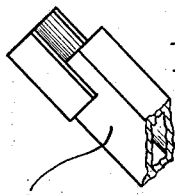

2,379,921

UNITED STATES PATENT OFFICE 2,379,921

SAMPLER OF GRANULAR MATERIAL

Dominick A. Pizzirani and Franklin M. Gould, United States Army, and Souren Z. Avedikian, New York, N. Y.

Application May 30, 1942, Serial No. 445,257

3 Claims. (Cl. 73—421)

(Granted under the act of March 3, 1883, as amended April 30, 1928; 370 O. G. 757)

The invention described herein may be manufactured and used by or for the Government for governmental purposes, without the payment to us of any royalty thereon.

This invention relates to a method of and apparatus for sampling soda lime.

A broad aim of the invention is to improve over the commonly referred to "thief" method now generally employed in extracting samples of soda lime.

The procedure usually involved in this "thief" method of obtaining test samples consists of inserting a sampling device into the soda lime contents of a shipping drum so that upon withdrawal thereof a representative portion is taken from the drum for test purposes, analysis, etc. Such method has however proved unsatisfactory since, as has been found to be the case, whether a sample from a single drum or samples are taken from several drums and mixed together, the sample is not a faithful and average sample of the whole production run because the soda lime in one drum may vary considerably in proportion of sieve size, etc., relative to the soda lime in a second drum of the same production run.

Formation of fines resulting from the use of the mechanical sampling device, and the need of an inspector being in attendance for the entire period of time required to complete a production run, are other factors which militate against the method of sampling alluded to in the preceding paragraph.

The method and apparatus contemplated by this invention comprehends the subdividing of a quantity of the soda lime so as to secure, for example, two-twelfths of the quantity; then the subdividing of said two-twelfths so as to secure one-twelfth thereof; and, finally, subdividing said one-twelfth so as to secure a one-twelfth thereof in a sampling safe to be saved for purposes of analysis.

The apparatus involved in this invention is of a capacity sufficient to take care of a complete day's run of soda lime; permits the continuous receiving and storing of samples of the run; and is so equipped that the apparatus may be locked or otherwise so secured as to prevent tampering and the practice of fraud in obtaining such samples.

The invention and the manner in which the above and other objects thereof are attained will be best understood from a study of the following detailed description, made in conjunction with the accompanying drawings, in which—

Figure 1 is a somewhat diagramatic view of the invention, with certain parts of the apparatus shown in elevation, and the other parts broken away and shown in section;

Figure 2 is a top plan view of a hopper and associated parts;

Figure 3 is a perspective view of two companion chutes of a riffle;

Figure 4 is a perspective view of two intermediate chutes forming part of the first riffle;

Figure 5 is a top plan view of a second riffle and associated spreader;

Figure 6 is a fragmentary detailed view of the baffle-equipped end of a discharge chute;

Figure 7 is a side elevational view of a sample safe, with parts broken away and shown in section; and Figure 8 is a fragmentary perspective view of the inlet and of a discharge chute.

The important consideration of this invention is to obtain samples of an amount proportional to the quantity of soda lime constituting each production run, and consequently samples that will be representative of an entire day's run.

In connection with the above statement it may be explained that a daily production period, in terms of production runs, consists of three such runs. Each production run usually comprises six drums, each of which is of a predetermined capacity. Thus eighteen drums constitute, in the example herein given, a complete daily production period.

In accordance with this invention the drums are suitably identified, as by being consecutively numbered or as might be found desirable or preferable for readily associating the several drums with the respective production runs. For example, drums numbered one (1) to six (6) contain the soda lime of the first production run, while drums numbered seven (7) to twelve (12), both inclusive, would contain the soda lime of the second production run, and drums thirteen (13) to eighteen (18) would contain the soda lime of the third and final production run of the daily production period.

The sample safe 29, hereinafter more fully referred to, is of such a capacity that it will accommodate samples of equal quantity and corresponding in number to the number of production runs in a daily production period, in the present instance, three. Also the samples are suitably isolated and identifiable within the safe so as to insure accuracy and facilitate the rejecting of any production run or batch. Also, and as will presently appear, the safe is tamperproof, thus dispensing with the need of an inspector being in attendance at all times.

The samples referred to above are delivered directly to the sample safe from the sampling apparatus. The batch of soda lime from which a sample is to be taken is fed to the hopper 5 of the sampling apparatus. The material passes into hopper 5 through a funnel 6 that rests on a seat 7 provided at the upper end of the hopper. The lower end of the hopper is disposed to discharge into a filling drum 8 placed therebeneath; the drum being one of a series of six constituting one complete production run as hereinbefore explained.

The discharge neck 9 of funnel 6 has fitted and suitably secured therein a riffle indicated generally by the reference numeral 10. Riffle 10 is composed of a battery of fractioning chutes 11 and 12. The chutes 11 are divided into two series of five each, separated by two intermediate chutes 12 as shown clearly in Figure 2. Alternate chutes 11 face toward one side of hopper 5 and intermediate chutes 11 face toward a relative opposite side of hopper 5 to discharge the contests thereof through the hopper as indicated by the arrows $a$ and into the drum 8. The two intermediate chutes 12 are open at the bottoms thereof to discharge their contents, as indicated by arrows $b$, onto a spreader 13 to be directed by the latter into the several fractioning chutes of a second riffle 14, as indicated by arrows 15.

Suitably mounted within hopper 5 and spaced from the walls of the latter is a tubular column 16. The column 16 is in alignment with the discharge neck 9 of funnel 6 and is open at its upper and lower ends, with the bottoms of fractioning chutes 12 extending into the column through the top of the column.

Riffle 14 and associated spreader or baffle 13 are positioned wholly within the column 16. Like to riffle 10, riffle 14 is composed of, in the present instance, twelve fractioning chutes 17, and alternate chutes face in opposite directions. All of the chutes 17, with the exception of one, discharge into the column 16 so that the contents thereof, as indicated by arrows 18 pass from the column to discharge with the contents of chutes 11 from hopper 5 into drum 8 as indicated by arrows 19.

The excepted fractioning chute 17 has extending therefrom a discharge chute 20. Chute 20 projects through an opening provided therefor in the wall of hopper 5 to terminate within a smaller hopper 21 that is suitably provided with an opening in the wall thereof to accommodate said chute. Thus the contents of the fractioning chute 17 herein referred to is carried off by chute 20 to hopper 21 where final subdivision is made.

Hopper 21 has depending therefrom a discharge neck 22 disposed so as to discharge into an auxiliary drum 23. The hopper is also provided with a door 24 that is normally locked by suitable lock means 25 to prevent unauthorized access to the interior of hopper 21.

Fitted within the discharge neck 22 of hopper 21 is a riffle indicated generally by the numeral 26. Riffle 26 approximates in structure riffle 14 and like to the latter, one of the fractioning chutes 27 of riffle 26 has leading therefrom a discharge chute 28 that serves to direct the contents of said fractioning chute to the aforementioned sample safe 29.

To insure distribution of that division of the soda lime batch entering hopper 21 over the riffle 26, the end of chute 20 within the mentioned hopper is flared and has disposed and advantageously arranged therein baffles 30, as best illustrated in Figure 6. The divisions of soda lime passing through the other chutes 27 of riffle 26 pass through neck 22 into the auxiliary drum 29 as indicated by the arrows 31.

Sample safe 29 is divided into, in the present instance, three sample compartments 32, 33, and 34, for which slides 35, 36, and 37 are provided for isolating the compartments and contents thereof. Each of the slides works in tracks provided therefor within the safe and are readily operable from one side of the safe as shown.

Any suitable provision may be made for securing the contents of the safe against being tampered with, and to this end safe 29 is provided with a cover or lid 38 that is locked in position through the medium of vertical bails 39 rising from opposed walls of the safe and projecting through slots in lid 38; a hold-down bar 40 trained through the bails 39; and a padlock 41 secured on one end of bar 40 to prevent unauthorized withdrawal of the bar 40 through the bails 39.

The lid 38 is further characterized by a centrally positioned, upstanding neck 42 that receives the outlet end of chute 28 as indicated in Figure 1 so that the sample passes directly from the chute 28 into the proper compartment of the sample safe.

In obtaining samples of the several batches of soda lime constituting a day's production run, each batch is individually passed through the apparatus. Approximately ten-twelfths of the batch are directed by fractioning chutes 11 of the first riffle 10 to the filling drum 8, while the remaining two-twelfths pass through fractioning chutes 12 of riffle 10 to be subjected to a dividing process by the riffle 17. As is apparent, riffle 17 extracts approximately one-twelfth of the soda lime diverted thereto, and this extracted division is carried off by chute 20 to hopper 21. The soda lime fed to hopper 21 is subjected by riffle 26 to a dividing process as a result of which approximately eleven-twelfths of such division of soda lime, as indicated by the arrows 31, pass into the auxiliary drum 23 and the remaining one-twelfth is conveyed by chute 28 to the sample compartment provided in the sample safe 29.

Obviously as a sample from each of the successive batches constituting the daily production run fills its compartment within safe 29, the attendant moves the closure slide for that compartment inward of the safe to isolate that sample from the sample of the next succeeding soda lime batch. At the completion of any production run or batch, the soda lime accumulating in auxiliary drum 23 is emptied into the final drum 8 of that particular run. At the end of the daily production period the three sample compartments of safe 29 are filled, after which the safe may be removed and used for safely storing the extracted samples for future analysis.

In actual practice hoppers 5 and 21 may be supported in any suitable manner and the baffle means for spreading the soda lime as it is discharged onto a riffle may be as found most practicable. In fact many modifications and variations in structure and specific mode of operation may be made, and it is accordingly understood that the invention is not limited to that which has been illustrated and described herein by way of example, but is to be considered as embracing all forms of apparatus and variants of method falling within the scope of the appended claims.

What is claimed as new is:

1. An apparatus for securing a sample of material for the purpose specified embodying means for directing a continuous stream of the material toward a receptacle for receiving such material, said means being in the form of a hopper open at its top and bottom, and a vertical column axially positioned in the hopper and spaced from the peripheral wall of the hopper, a riffle disposed within the hopper above and in alignment with said column, a riffle disposed within said column, means at the upper end of the hopper for distributing material uniformly over the width of the first riffle, means intermediate the first and second riffles for uniformly distributing material over the width of the second riffle, the first riffle consisting of a plurality of fractioning chutes certain of which discharge into the space between the walls of the hopper and column on both sides of the column and other of which divert fractions of the material to the second chute, and the second riffle having fractioning chutes certain of which direct sub-divisions of the material fractionized by the second riffle through the column and other of which have a discharge chute leading therefrom and terminating exteriorly of the hopper to divert a fraction of the material subdivided by the second riffle to a point remote from the hopper, and means at the free end of said discharge chute for securing a sample of material discharging from the chute.

2. An apparatus for securing a sample of material for the purpose described and comprising, a hopper for directing the material in a continuous stream into a filling drum, a riffle having a plurality of fractioning chutes for initially dividing the material entering the hopper into a number of equal parts and mounted within the upper end of the hopper, a second riffle mounted below the first riffle to receive a fraction of the material from the first riffle and having a plurality of fractioning chutes equalling in number the number of fractioning chutes of the first riffle for subdividing the fraction of the material received from the first riffle, a second hopper having a discharge neck, means leading from the second riffle to the second hopper for gravitationally feeding a subdivision of the material fractionized by the second riffle to said second hopper, a riffle in the discharge neck of the second hopper and having a plurality of fractioning chutes equalling in number the chutes in the first riffle for fractionizing the material fed to the second hopper and diverting some of the material so fractionized to a receptacle and other of such fractionized material to a sample safe; and each of the first and second riffles having certain of its fractioning chutes discharging into the first hopper.

3. In a sampling apparatus of the character and for the purpose described, a hopper open at its top and bottom, a column centrally and vertically disposed in said hopper, a funnel mounted at the top of the hopper, a riffle having a plurality of fractioning chutes mounted in the bottom of the funnel and in alignment with the column, certain of said chutes facing to discharge into the space between the walls of the hopper and column on both sides of said column, and other of the chutes facing to discharge into said column, and a riffle having a plurality of fractioning chutes mounted in the column, certain of the chutes of the second riffle facing to discharge into the column, and a discharge chute leading from other of the chutes of the second riffle outwardly of said column and hopper.

DOMINICK A. PIZZIRANI.
FRANKLIN M. GOULD.
SOUREN Z. AVEDIKIAN.